(12) United States Patent
Yan et al.

(10) Patent No.: US 11,222,264 B1
(45) Date of Patent: Jan. 11, 2022

(54) METHOD AND DEVICE FOR RECOGNIZING SPACE-FREQUENCY BLOCK CODE

(71) Applicant: NAVAL AVIATION UNIVERSITY OF PLA, Shandong (CN)

(72) Inventors: Wenjun Yan, Shandong (CN); Qing Ling, Shandong (CN); Limin Zhang, Shandong (CN); Ziqiang Zhu, Shandong (CN); Yuyuan Zhang, Shandong (CN); Chong Lin, Shandong (CN); Kaiwen Tan, Shandong (CN)

(73) Assignee: NAVAL AVIATION UNIVERSITY OF PLA, Shandong (CN)

( * ) Notice: Subject to any disclaimer, the term of this patent is extended or adjusted under 35 U.S.C. 154(b) by 0 days.

(21) Appl. No.: 17/325,891

(22) Filed: May 20, 2021

(30) Foreign Application Priority Data

Aug. 28, 2020 (CN) .......................... 202010884569.4

(51) Int. Cl.
| | |
|---|---|
| *H04B 7/02* | (2018.01) |
| *G06G 7/00* | (2006.01) |
| *G06N 3/08* | (2006.01) |
| *G06N 3/04* | (2006.01) |
| *H04L 1/06* | (2006.01) |

(52) U.S. Cl.
CPC ............. *G06N 3/08* (2013.01); *G06N 3/0445* (2013.01); *H04L 1/0606* (2013.01)

(58) Field of Classification Search
CPC ....... G06N 3/08; G06N 3/0445; H04L 1/0606

USPC ..... 706/15, 20; 375/267, 299, 347; 455/101, 455/132

See application file for complete search history.

(56) References Cited

U.S. PATENT DOCUMENTS

2011/0086614 A1\* 4/2011 Brisebois .............. H04W 12/08
455/411

OTHER PUBLICATIONS

Qi Li et al., "A Novel CSI Feedback Approach for Massive MIMO Using LSTM-Attention CNN" Special Section On Artificial Intelligence for Physical-Layer Wireless Communications, vol. 8, IEEE Access, Jan. 3, 2020, pp. 7295-7302.\*

\* cited by examiner

*Primary Examiner* — Tesfaldet Bocure

(74) *Attorney, Agent, or Firm* — Hodgson Russ LLP

(57) ABSTRACT

The present disclosure provide a method for recognizing a space frequency block code (SFBC), including: obtaining a cross-correlation function of a reception signal, and obtaining a Fourier transformation of the cross-correlation function; obtaining data containing labels by labeling a sample containing a real part and an imaginary part of the Fourier transformation, and inputting the data containing labels into an initial CNN-LSTM network for training until convergence is reached, to obtain a final CNN-LSTM network; and obtaining unlabeled data to be recognized, and inputting the data to be recognized into the final CNN-LSTM network to obtain a SFBC recognition result.

12 Claims, 5 Drawing Sheets

METHOD AND DEVICE FOR RECOGNIZING SPACE-FREQUENCY BLOCK CODE

CROSS-REFERENCE TO RELATED APPLICATION

This application is based upon and claims priority to and benefits of Chinese Patent Application Serial No. 202010884569.4, filed with the State Intellectual Property Office of P. R. China on Aug. 28, 2020, the entire contents of which is incorporated by reference herein.

FIELD

The present disclosure relates to a field of signal processing technology, and more particularly to a method and a device for recognizing a space-frequency block code (SFBC).

BACKGROUND

The multiple-input multiple-output (MIMO) system becomes has become an important technology in the field of radio communication due to its effective utilization of space resources. As a kind of coding method using the MIMO system, recognition of the space-frequency block coding has attracted more and more attention.

However, this processing method generally requires artificial design of feature parameters and testing thresholds, a large amount of data is collected each time a signal is identified, and its statistical features are calculated repeatedly.

SUMMARY

Embodiments of the present disclosure seek to solve at least one of the problems existing in the related art to at least some extent.

Embodiments of the present disclosure provide a method for recognizing a space frequency block code (SFBC), including: obtaining a cross-correlation function of a reception signal, and obtaining a Fourier transformation of the cross-correlation function; obtaining data containing labels by labeling a sample containing a real part and an imaginary part of the Fourier transformation, and inputting the data containing labels into an initial CNN-LSTM network for training until convergence is reached, to obtain a final CNN-LSTM network; and obtaining data to be recognized, and inputting the data to be recognized into the final CNN-LSTM network to obtain a SFBC recognition result.

Embodiments of the present disclosure provide an electronic device, including: a memory, a processor, and a computer program stored in the memory and executable by the processor. When the processor executes the computer program, a method for recognizing a space frequency block code (SFBC) is implemented, the method including: obtaining a cross-correlation function of a reception signal, and obtaining a Fourier transformation of the cross-correlation function; obtaining data containing labels by labeling a sample containing a real part and an imaginary part of the Fourier transformation, and inputting the data containing labels into an initial CNN-LSTM network for training until convergence is reached, to obtain a final CNN-LSTM network; and obtaining data to be recognized, and inputting the data to be recognized into the final CNN-LSTM network to obtain a SFBC recognition result.

Embodiments of the present disclosure provide a non-transitory computer-readable storage medium with computer programs stored thereon that, when executed by a processor, a method for recognizing a space frequency block code (SFBC) is implemented, the method including: obtaining a cross-correlation function of a reception signal, and obtaining a Fourier transformation of the cross-correlation function; obtaining data containing labels by labeling a sample containing a real part and an imaginary part of the Fourier transformation, and inputting the data containing labels into an initial CNN-LSTM network for training until convergence is reached, to obtain a final CNN-LSTM network; and obtaining data to be recognized, and inputting the data to be recognized into the final CNN-LSTM network to obtain a SFBC recognition result.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

Above and other aspects and advantages of embodiments of the present disclosure will become apparent and more readily appreciated from the following descriptions made with reference to the drawings, in which.

DETAILED DESCRIPTION

Figure 1:
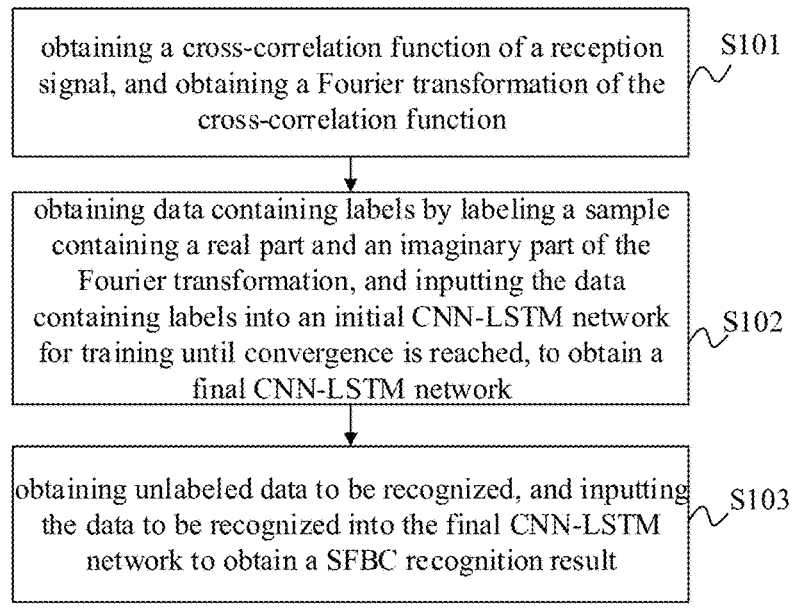
FIG. 1 is a flow chart of a method for recognizing a space frequency block code (SFBC) according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Description will be made to a method and a device for recognizing a space frequency block code (SFBC) with reference to the accompany drawings.

In detail, FIG. 1 is a flow chart of a method for recognizing a SFBC according to an embodiment of the present disclosure.

As illustrated in FIG. 1, the method for recognizing a SFBC includes followings.

At block S101, a cross-correlation function of a reception signal is obtained, and a Fourier transformation of the cross-correlation function is extracted.

Alternatively, in an embodiment of the present disclosure, the cross-correlation function may be determined based on an equation of:

$$y(k) = r_0(k)r_1(k + N/2), k = 0, 1, \ldots M,$$

$$K = M - \frac{N}{2},$$

where, $r_0(k)$ is a reception signal of a first antenna, $r_1(k+N/2)$ is a reception signal of a second antenna, M is a length of a reception signal sequence, N is a given subcarrier number, K is a length of the cross-correlation function, and $y=[y(0),y(1), \ldots y(K-1)]$ is the cross-correlation function of the reception signal.

For example, a reception signal of the first antenna is $r_0$, and a reception signal of the second antenna is $r_1$. It may be understandable that, in an embodiment of the present disclosure, pre-processing may be performed on the reception signal $r_0$ and the reception signal $r_1$, and a cross-correlation function y of $r_0$ and $r_1$, and a Fourier transformation Y of the cross-correlation function y is obtained.

Figure 2:
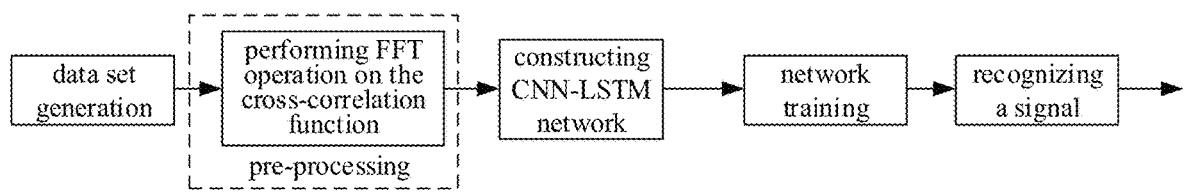
FIG. 2 is a flow chart of a method for recognizing a SFBC according to an embodiment of the present disclosure.

As illustrated in FIG. 2, a process for recognizing a SFBC may include data set generation, pre-processing the data set, constructing a CNN-LSTM network, network training, and recognizing a signal. Performing the pre-processing on the reception signal r may include follows.

Firstly, the calculation equation of the cross-correlation function of the reception signal is solved, and $y=[y(0), y(1), \ldots y(K-1)]$ is obtained. The cross-correlation function is defined as $y(k)=r_0(k)r_1(k+N/2), k=0, 1, \ldots M$, where, $$K = M - \frac{N}{2},$$

$r_0(k)$ is a reception signal of a first antenna, $r_1(k+N/2)$ is a reception signal of a second antenna, M is a length of a reception signal sequence, N is a given subcarrier number, K is a length of the cross-correlation function, r(k) is the $k^{th}$ symbol of the reception signal. Then, Fourier transformation is performed on $y=[y(0), y(1), \ldots y(K-1)]$, to obtain pre-processed signal data.

The signal data obtained by performing the pre-processing may include a SM (spatial multiplexing) signal and an AL (Alamouti) signal.

Alternatively, in an embodiment of the present disclosure, a spectrum of signal data of a SM (spatial multiplexing) signal has no peak, and a spectrum of an AL (Alamouti) signal has a peak value every K/16.

Figure 3:
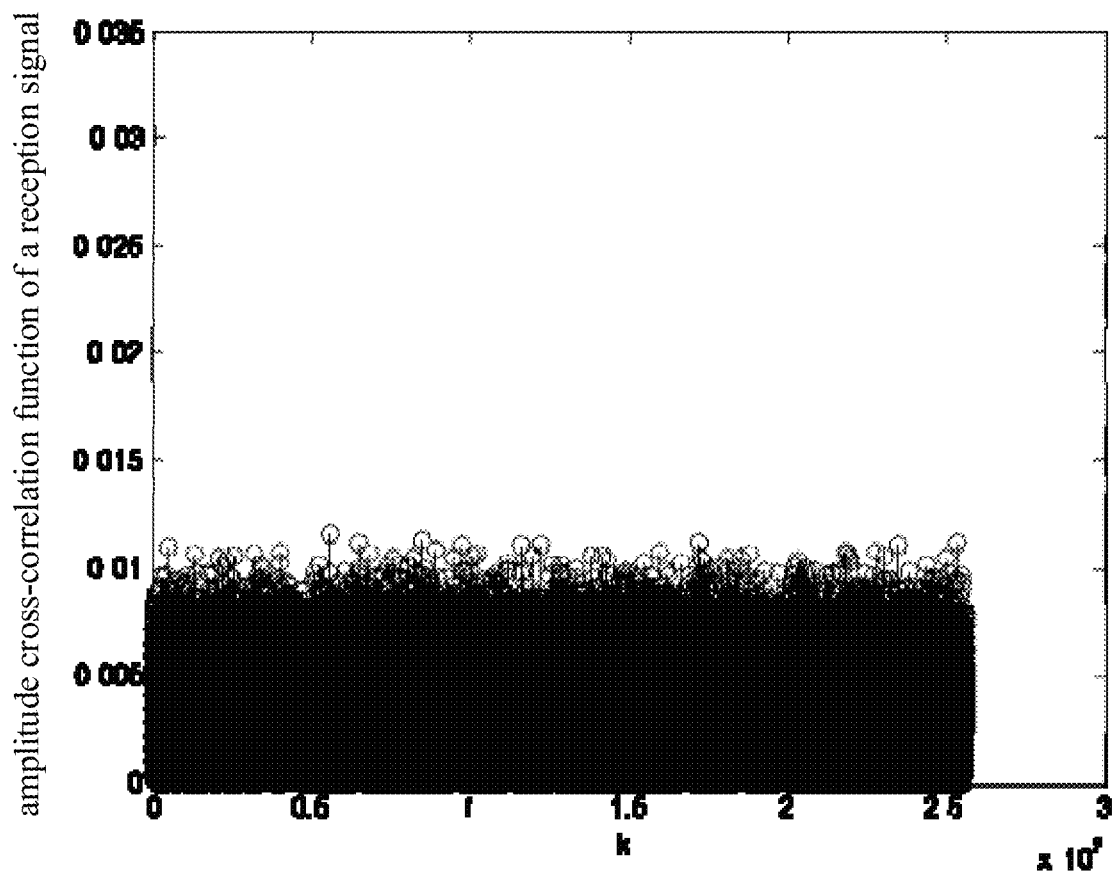
FIG. 3 is a frequency domain graph of a cross-correlation function of a SM reception signal according to an embodiment of the present disclosure.
Figure 4:
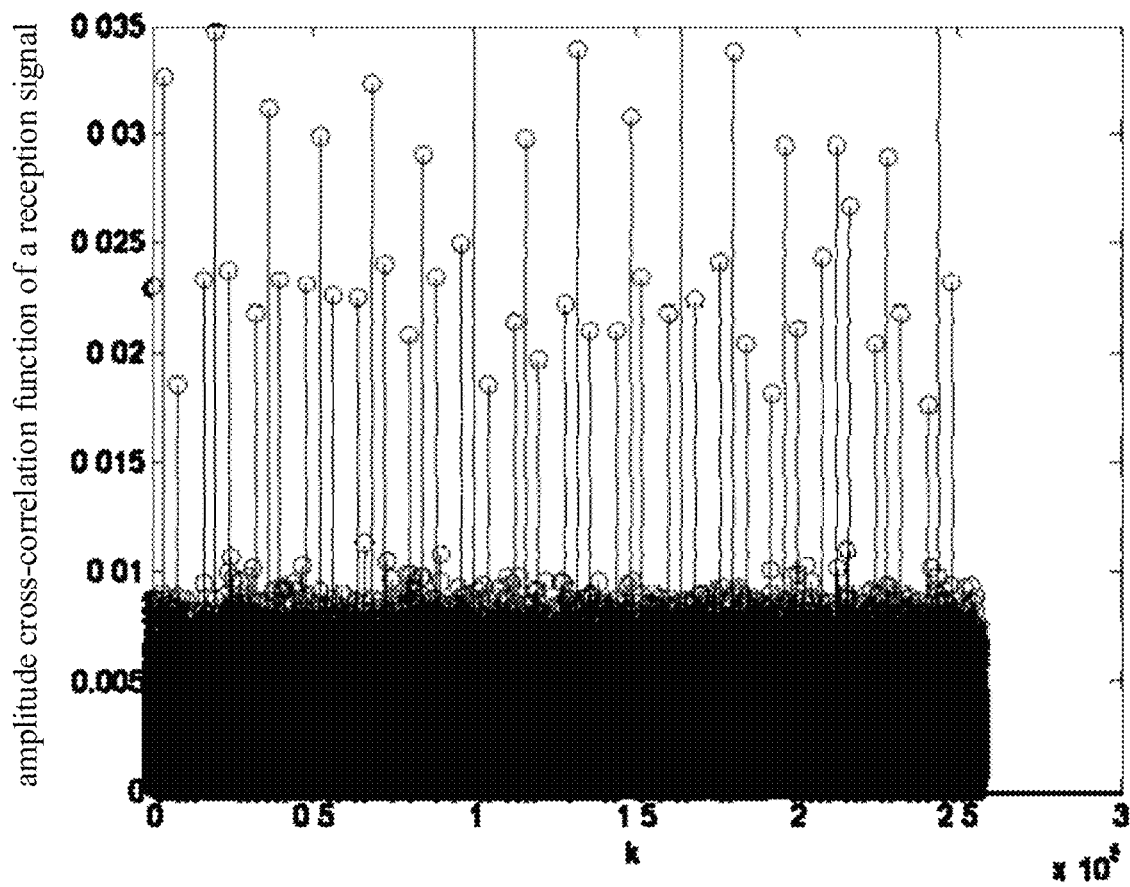
FIG. 4 is a frequency domain graph of a cross-correlation function of an AL reception signal according to an embodiment of the present disclosure.

FIG. 3 is a frequency domain graph of a cross-correlation function of a SM reception signal according to an embodiment of the present disclosure. The frequency domain graph of the cross-correlation function of the SM reception signal has no peak value. FIG. 4 is a frequency domain graph of a cross-correlation function of an AL reception signal according to an embodiment of the present disclosure. The frequency domain graph of the cross-correlation function of the AL reception signal has one or more peak values. Therefore, this difference may be input into a CNN (convolutional neural network)-LSTM (long short-term memory) network as a feature for recognition purpose. A detailed derivation process may be as follows.

For a SM communication system, a data set d with a length of 2N is divided into blocks and transmitted by two antennas in blocks. Two new data vectors q generated based on a data set of the $b^{th}$ block by spatial multiplexing may be as follows:

$$q^{(b,0)}=[d^{(b)}(0),d^{(b)}(2), \ldots d^{(b)}(2N-2)],$$

$$q^{(b,1)}=[d^{(b)}(1),d^{(b)}(3), \ldots d^{(b)}(2N-1)].$$

For an AL communication system, a data set d with a length of N is divided into blocks and transmitted by two antennas in blocks. Two new data vectors u generated based on a data set of the $b^{th}$ block by spatial encoding may be as follows:

$$u^{(b,0)}=[d^{(b)}(0),-d^{(b)*}(1),d^{(b)}(2), \ldots ,d^{(b)}(N-2),-d^{(b)*}(N-1)],$$

$$u^{(b,1)}=[d^{(b)}(1),d^{(b)*}(0),d^{(b)}(3),d^{(b)*}(2), \ldots ,d^{(b)}(N-1),d^{(b)*}(N-2)].$$

After the spatial encoding, an orthogonal frequency division multiplexing (OFDM, a form of multi-carrier modulation) transformation is performed. The detailed method may be as follows. An inverse fast Fourier transformation (IFFT) is performed on the obtained new data sets a and q, and a prefix is added, thus an OFDM block is obtained. When a signal is AL encoded, the $b^{th}$ OFDM block of the $f^{th}$ emission antenna, denoted as $x^{(b,f)}$, is:

$$x^{(b,f)}(n) = \frac{1}{\sqrt{N}}\sum_{k=0}^{N-1} u^{(b,f)}(k)e^{\frac{j2\pi kn}{N}}.$$

When a signal is a SM signal, $x^{(b,f)}$ is:

$$x^{(b,f)}(n) = \frac{1}{\sqrt{N}}\sum_{k=0}^{N-1} q^{(b,f)}(k)e^{\frac{j2\pi kn}{N}}.$$

Where, $n=-v, \ldots N-1$, $f=0, 1$ represent numbers of the emission antennas, $u^{(b,f)}(k)$ represents the $k^{th}$ data symbol of $u^{(b,f)}$, and $q^{(b,f)}(k)$ represents the $k^{th}$ data symbol of $q^{(b,f)}(k)$.

An emission signal s is composed of emission signals $x^{(b)}$ of different blocks. Signals $s^{(0)}$ and $s^{(1)}$ on two the emission antennas are:

$$s^{(0)}=[x^{(0,0)},x^{(1,0)},x^{(2,0)}, \ldots ],$$

$$s^{(1)}=[x^{(0,1)},x^{(1,1)},x^{(2,1)}, \ldots ], \text{respectively.}$$

Therefore, after an emission signal is transmitted through an information channel, a reception signal $r^{(i)}$ of the $i^{th}$ reception antenna may be represented as:

$$r^{(i)}(m) = \sum_{d=0}^{1}\sum_{l=0}^{L_h-1} h_{di}(l)s^{(d)}(m-l) + n^{(i)}(m).$$

Where, $i=0, 1, \ldots n_r-1$, $n_r$ is a total number of the reception antennas, $h_{di}(l)$ is a channel impulse response between the $d^{th}$ emission antenna and the $i^{th}$ reception antenna, $n^{(i)}(m)$ is a Gauss white noise sequence, $L_h$ is the number of independent paths, and $s^{(d)}(m)$ is the $m^{th}$ sequence of signal $s^{(d)}$ on the $d^{th}$ emission antenna.

Considering that, $y=[y(0), y(1), \ldots y(K-1)]$, $y(k)=r_0(k) r_1(k+N/2)$, $k=0, 1, \ldots M$, where, $$K = M - \frac{N}{2},$$

and a random variance may be represented as a sum of its mean value and another variable representing a deviation and having a zero mean, y(k) of the SM signal and the AL signal may be respectively represented as:

$$y^{SM}(k)=E\{y^{SM}(k)\}+\psi^{SM}(k), \text{ and}$$

$$y^{AL}(k)=E\{y^{AL}(k)\}+\psi^{AL}(k).$$

Where, $E\{y^\xi(k)\}$ is a mean value of $y^\xi(k)$, $\psi^\xi(k)$ represents a deviation of the mean value, and $\xi \in \{AL, SM\}$.

The emission signals are independently and identically distributed, thus, it is easy to determine that:

$$E\{y^{SM}(k)\}=0.$$

$y^\xi(k)$ and $\psi^\xi(k)$ are considered as noises hidden in $E\{y^\xi(k)\}$, thus, when there is no noise, $y^{SM}=[0, 0, 0, \ldots]$.

For the AL signal, a sequence of $y^{AL}(k)$ is determined below in detail. Firstly, a cross-correlation function of an emission end is determined, and following is obtained:

$$E[x^{(b,0)}(n)x^{(b,1)}(n+N/2)] = \frac{1}{N}E\left[\sum_{k_0=0}^{N-1} u^{(b,0)}(k_0)e^{j\frac{2\pi k_0 n}{N}} \times \sum_{k_1}^{N-1} u^{(b,1)}(k_1)e^{j\frac{2\pi k_1 (n+N/2)}{N}}\right].$$

Where, $u^{(b,0)}(k_0)$ is the $k_0^{th}$ data in the vector $u^{(b,0)}$, $u^{(b,1)}(k_1)$ is the $k_1^{th}$ data in the vector $u^{(b,1)}$. A variation range of $k_0$ and $k_1$ is a length range $[0, N-1]$ of the vector u.

The cross-correlation function is determined based on $u^{(b,0)}(k_0)$ and $u^{(b,1)}(k_1)$, and the exponential part only determines its phase. Therefore, for each $u^{(b,0)}(k_0)$, only one $u^{(b,1)}(k_1)$ are conjugate with $u^{(b,0)}(k_0)$, where, $k_1=k_0\pm1$.

Therefore, followings are obtained.

$$E[x^{(b,0)}(n)x^{(b,1)}(n+N/2)] = \frac{1}{N}\sigma_s^2\left[-2e^{j\frac{2\pi n}{N}} - 2e^{j\frac{2\pi \times 5n}{N}} - 2e^{j\frac{2\pi \times 9n}{N}} + \ldots - 2e^{j\frac{2\pi \times (N+N-1)n}{N}}\right].$$

$$= \frac{-2\sigma_s^2}{N}\left\{e^{j\frac{2\pi n}{N}} + e^{j\frac{2\pi \times 5n}{N}} + \ldots e^{j\frac{2\pi \times (N+N-1)n}{N}}\right\}$$

Further, it is simplified as:

$$E[x^{(b,0)}(n)x^{(b,1)}(n+N/2)] = \begin{cases} -\sigma_s^2 & n=0 \\ -j\sigma_s^2 & n=N/4 \\ \sigma_s^2 & n=N/2 \\ j\sigma_s^2 & n=3N/4 \\ 0 & \text{others} \end{cases}.$$

Where, $\sigma_s$ is a signal power.

After passing the channel and the noise, an expression of $E\{y^{AL}(k)\}$ is:

$$E\{y^{AL}(k)\} = E[r^{(i)}(k)r^{(i')}(k+N/2)] =$$

$$\sum_{d,d'=0}^{1}\sum_{l,l'=0}^{L_h-1} h_{di}(l)h_{d'i'}(l') \times E[s^{(b,d)}(k-l) \times s^{(b,d')}(k+N/2-l')].$$

Further, it is simplified as:

$$E\{y^{AL}(k)\} = \sigma_s^2 \sum_{l,l'=0}^{L_h-1}(h_{0i}(l)h_{1i'}(l') - h_{1i}(l)h_{0i'}(l')) \times$$

$$\Pi(k, k+N/2-l-l')\begin{cases} -1 & k = \frac{l'-l}{2} + (N+v)[k+v]_{N+v} \\ -j & k = \frac{N}{4} + \frac{l'-l}{2} + (N+v)[k+v]_{N+v} \\ 1 & k = \frac{N}{2} + \frac{l'-l}{2} + (N+v)[k+v]_{N+v} \\ j & k = \frac{3N}{4} + \frac{l'-l}{2} + (N+v)[k+v]_{N+v} \\ 0 & \text{others} \end{cases}$$

where, $\Pi(k,k+N/2-l-l')$ represents an indicator function whose meaning is that $s^{(b,d)}(k-l)$, $s^{(b,d')}(k+N/2-l')$ are in the same OFDM block, and v is a cycle prefix.

$E\{y^{AL}(k)\}$ has four peaks in one subcarrier period, locating at $$(N+v)\times n + \frac{l-l'}{2}, (N+v)\times n + N/4 + \frac{l-l'}{2},$$

$$(N+v)\times n + N/2 + \frac{l-l'}{2},$$

and $$(N+v)\times n + 3N/4 + \frac{l-l'}{2}$$

respectively.

$y^\xi(k)$ and $\psi^\xi(k)$ are considered as noises hidden in $E\{y^\xi(k)\}$. When there is no noise, $$y^{AL}=[C_1,0,0\ldots C_2,0,0\ldots C_3,0,0\ldots C_4,0,0\ldots].$$

Where, $C_1=-1$, $C_2=-j$, $C_3=1$, and $C_4=j$, with 15 consecutive zeros between each two of them. Therefore, the sequence $y^{AL}$ is a periodic function with a period of 16.

For example, Y=[Y(0), Y 1), ... Y(K−1)] is a discrete Fourier transformation (DFT) of the vector y:

$$Y(n) = \frac{1}{\sqrt{K}} \sum_{k=0}^{K-1} y(k) e^{-j2\pi kn/K}.$$

$$n = 0, 1, \ldots K-1$$

It may be obtained that, $$Y^{SM}(n) = \Psi^{SM}, n = 0, 1, \ldots K-1,$$

$$Y^{SM}(n) = \begin{cases} \varsigma + \Psi^{AL}(n) & \text{every } \frac{K}{16} \\ \Psi^{AL}(n) & \text{others} \end{cases}.$$

Where, $\varsigma$ is a peak value, $\Psi^{AL}(n)$ is a bias of the peak.

Therefore, $Y^{SM}$ does not have a peak, and $Y^{AL}$ has one peak every K/16, that is, a period is K/16.

At block S102, data containing labels is obtained by labeling a sample containing a real part and an imaginary part of the Fourier transformation, and the data containing labels is inputted into an initial CNN-LSTM network for training until convergence is reached, to obtain a final CNN-LSTM network.

It can be understood that, in an embodiment of the present disclosure, the real part and the imaginary part of the Fourier transformation Y extracted in the action at block S101 are arranged in two lines. For example, 128 values of the real part and 128 values of the imaginary part of the Fourier transformation Y may be extracted and arranged in two lines to forming a 2×128 matrix. And then, the sample containing the real part and the imaginary part of the Fourier transformation Y arranged in two lines is labeled with a label. In an embodiment, the label is used to indicate whether the sample is data of SM code or data of AL code. The data containing labels is inputted into the initial CNN-LSTM network for training until convergence is reached to obtain the final CNN-LSTM network.

In an embodiment, for a CNN-LSTM network with N layers, the training process may include a forward propagation stage from the first layer to the $N^{th}$ layer and a back propagation stage from the $N^{th}$ layer to the first layer. A detailed process may include the following. Weights of the network are initialed. After the training data passes through an input layer, a convolutional layer, a pooling layer, and a fully connected layer, an output result is obtained. An error between the output result and a target value is calculated. When the error is greater than an expected value, the error is transmitted back to the network, and the errors of the full connection layer, the pooling layer, the convolution layer and the input layer are obtained in turn. The weights are updated based on the errors of respective layers, and the above process is repeated.

In some embodiments, the final CNN-LSTM network includes a convolutional layer, a pooling layer, three circulation layers, and two fully connected layers. The convolutional layer uses 256 convolution kernels to perform convolution on a signal to obtain 256 feature graphs of 1×128 dimension. Each convolution kernel is a 2*1 convolution kernel. The pooling layer performs dimension reduction on the output of the convolution layer to reduce the size of the feature graphs, and further to reduce the combined one-dimensional signal (1×128 dimension) to a signal of 1×64 dimension. The circulation layers include three LSTM networks configured to process the convoluted one-dimensional signal to acquire timing information of the reception signal. An output of the network is in a one-hot coding form of 1×2 dimension. An SM code corresponds to [1 0], and an AL code corresponds to [0 1]. An output layer uses a normalized exponential function, such as Soft-max, as an activation function, and other layers in the network use a rectified linear unit (ReLU) as the activation function.

It can be understood that, the final CNN-LSTM network includes a convolutional layer, a pooling layer, three circulation layers, and two fully connected layers. Only the last fully connected layer with only two nodes uses the normalized exponential function (Soft-max function) as the activation function, and other layers of the network all use the ReLU as the activation function. An output of the network is in a one-hot coding form of 1×2 dimension. An input of the network is an input vector of 2×128 dimension.

Figure 5:
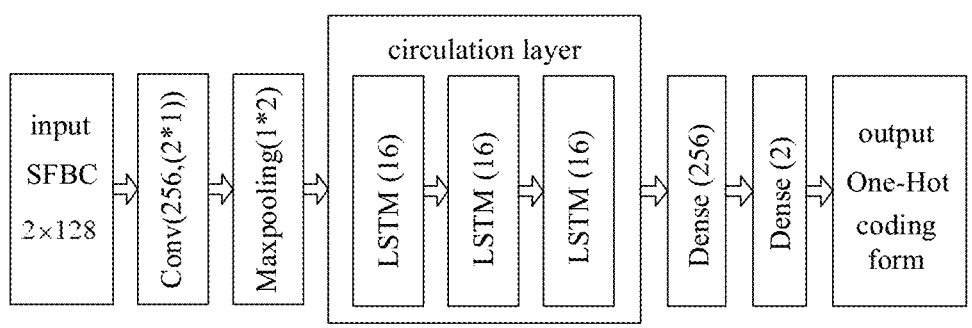
FIG. 5 is a schematic diagram illustrating a network structure according to an embodiment of the present disclosure.

As illustrated in FIG. 5, the convolutional layer uses 256 convolution kernels to perform convolution on a signal to obtain 256 feature graphs of 1×128 dimension. Each convolution kernel is a 2*1 convolution kernel. The pooling layer performs dimension reduction on the output of the convolution layer to reduce the size of the feature graphs, and further to reduce the combined one-dimensional signal (1×128 dimension) to a signal of 1×64 dimension. The circulation layers include three LSTM networks configured to process the convoluted one-dimensional signal to acquire timing information of the reception signal. An output of the network is in a one-hot coding form of 1×2 dimension. An SM code corresponds to [1 0], and an AL code corresponds to [0 1]. The output layer uses Soft-max as an activation function, and other layers in the network use the ReLU as the activation function.

In detail, the convolutional layer may extract the features of inputted space-time block codes, and merge the reception signal of 2×128 dimension in to 1×128 dimension. The convolutional layer uses 256 convolution kernels to perform convolution on the signal to obtain 256 feature graphs of 1×128 dimension. Each convolution kernel is a 2*1 convolution kernel. A relationship between the outputted feature graphs and the input may be as follows.

$$x_j^l = f\left( \sum_{i \in M^{l-1}} x_i^{l-1} k_{ij}^l + b_j^l \right)$$

Where, $M^{l-1}$ is the number of feature graphs in the $(l-1)^{th}$ convolutional layer, $x_j^l$ is the $j^{th}$ feature graph of the $l^{th}$ convolutional layer. $x_i^{l-1}$ is the $i^{th}$ feature graph of the $(l-1)^{th}$ convolutional layer, which corresponds to an input layer of the network. That is, the inputted reception signal of 2×128 dimension is taken as a feature graph. $k_{ij}^l$ is a convolution kernel between the feature graph $x_j^l$ and the feature graph $x_i^{l-1}$. $b_j^l$ is a bias of the $j^{th}$ feature graph of the $l^{th}$ convolutional layer.

$$f\left( \sum_{i \in M^{l-1}} x_i^{l-1} k_{ij}^l + b_j^l \right)$$

is an activation function of the $l^{th}$ convolutional layer.

The pooling layer performs dimension reduction on the output of the convolution layer to reduce the size of the feature graphs, and further to reduce the combined one-dimensional signal (1×128 dimension) to a signal of 1×64 dimension. This procedure may be represented as:

$$x_j^l = f(\beta_j^l p(x_j^{l-1}) + b_j^l)$$

Where, $x_i^{l-1}$ is the $j^{th}$ feature graph the $(l-1)^{th}$ convolutional layer, p(□) is a pooling method, $f(\beta_j^l p(x_j^{l-1})+b_j^l)$ is an activation function of the $l^{th}$ convolutional layer, $\beta_j^l$ is a weight of the $j^{th}$ feature graph of the $l^{th}$ convolutional layer, and $b_j^l$ is a bias unit of the $j^{th}$ feature graph of the $l^{th}$ convolutional layer. In an embodiment, a maximum pooling method is used.

The circulation layers include three LSTM networks configured to process the convoluted one-dimensional signal to acquire timing information of the reception signal. A feature of the LSTM network may be the fact that it carries information across multiple time steps, thus preventing earlier information from gradually disappearing during processing. The basic structure of the LSTM network includes a memory unit and three control units. The control units include an input gate, an output gate, and a forget gate. The input gate controls an influence degree of the current reception information on the memory unit. The output gate determines whether to output the memory unit information. The forget gate determines whether to retain previous information of the unit of memory. An output of the forget gate may be as follows.

$$f_t = \sigma(W_f[h_{t-1}, x_t] + b_f)$$

Where, $h_{t-1}$ is an output of the LSTM network at time point t−1, $x_t$ is an reception signal of the network at current time point, $W_f$ is a weight matrix of the forget gate, σ is a sigmoid activation function. The output of the forget gate is a number in [0, 1]. When the output is 0, no historical information is retained, and when the output is 1, all historical information is retained.

States of the input gate and a candidate vector may be updated as follows.

$$i_t = \sigma(W_i[h_{t-1}, x_t] + b_i)$$
$$l_t = \tanh(W_l[h_{t-1}, x_t] + b_l)$$
$$c_t = f_t \cdot c_{t-1} + i_t \cdot l_t$$

Where, $W_i$ is a weight matrix of the input gate $i_t$, $W_l$ is a weight matrix of the candidate vector $l_t$, $b_i$ is a bias corresponding to $W_i$, $b_l$ is a bias corresponding to $W_l$, tan h is an activation function to generate the candidate vector, $c_t$ is a state of the memory unit after update. The equation (2) shows that the state of the memory unit is determined by both the historical information controlled by the forget gate and the candidate vector controlled by the input gate. After the memory unit of the LSTM network is updated, its state is represented as:

$$o_t = \sigma(W_o[h_{t-1}, x_t] + b_o)$$
$$h_t = o_t \cdot \tanh(c_t)$$

Where, $W_o$ is a weight matrix of the output gate $o_t$, $b_o$ is a bias corresponding to $W_o$. This equation shows that the output of the LSTM network is determined by the memory unit controlled by the output gate, and the output gate determines the degree of its influence on the result.

At block S103, data to be recognized is obtained, and the data to be recognized is input into the final CNN-LSTM network to obtain a SFBC recognition result.

Figure 6:
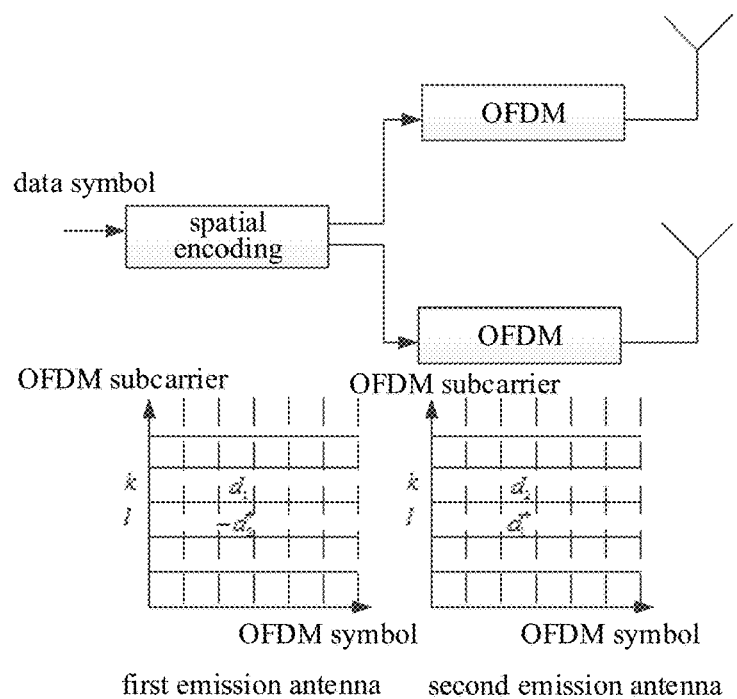
FIG. 6 is a frame diagram of a SFBC signal according to an embodiment of the present disclosure.
Figure 7:
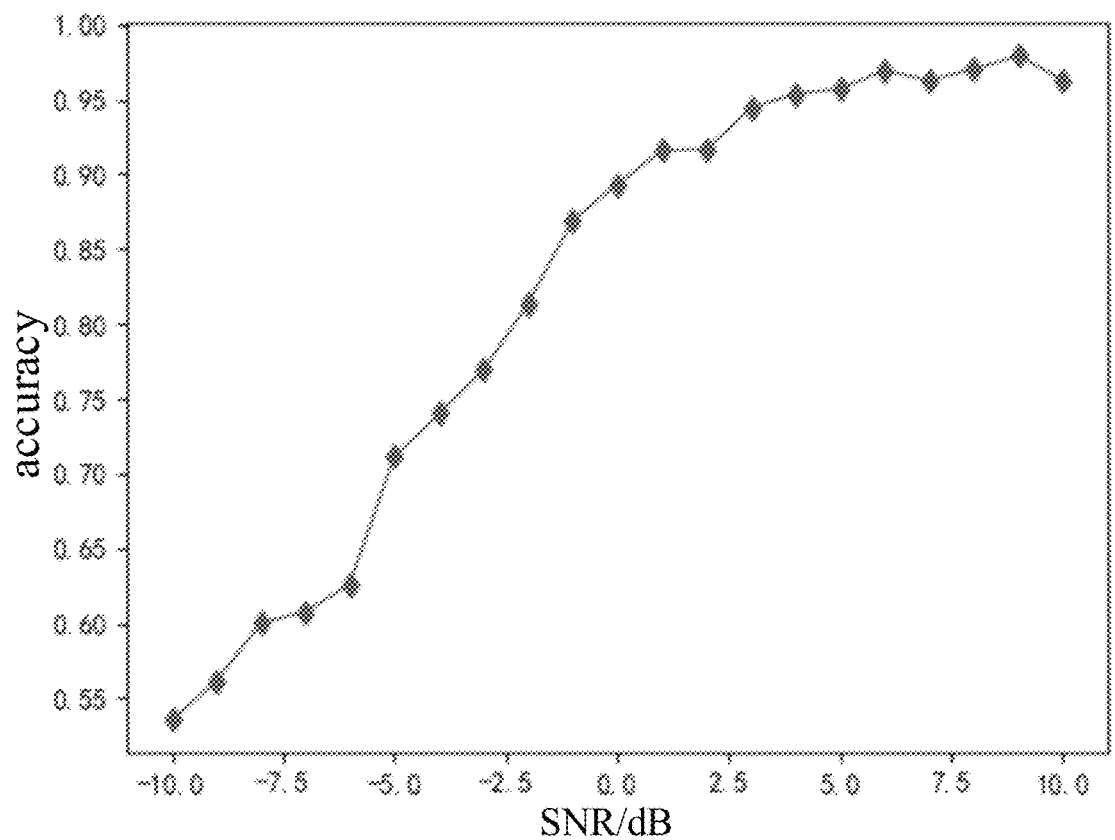
FIG. 7 is a schematic diagram illustrating a SFBC recognition result according to an embodiment of the present disclosure.

FIG. 6 is a frame diagram of a SFBC signal according to an embodiment of the present disclosure. FIG. 7 is a schematic diagram illustrating a recognition result according to an embodiment of the present disclosure. As illustrated in FIG. 6 and FIG. 7, when a signal-to-noise ratio (SNR) of the SFBC code is greater 1 dB, a recognition accuracy rate of the CNN-LSTM network may be greater than 90%, and finally stabilizes at about 97%, indicating a high accuracy.

With the method for recognizing a SFBC according to embodiments of the present disclosure, by preprocessing the received SFBC signal, and then rearranging the real part and imaginary part of the obtained signal data and inputting the real part and imaginary part of the obtained signal data into the network, the spatial features of the signal is extracted by using the CNN, and the temporal features of the signal is extracted by using the LSTM, and finally outputted from the network through the full connection layer, and the SFBC recognition result is finally obtained. Thus, the serial sequence SFBC code under a single receiving antenna can be identified, and the trained network model can be directly used for recognition without the need to recalculate the statistical features of the signal. It has better performance in the case of low signal-to-noise ratio, avoiding the problem of repeated feature calculation and artificial design of parameters, thus improving adaptability.

Further, description will be made to a device for recognizing a space-frequency block code (SFBC) with reference to the accompany drawings.

Figure 8:
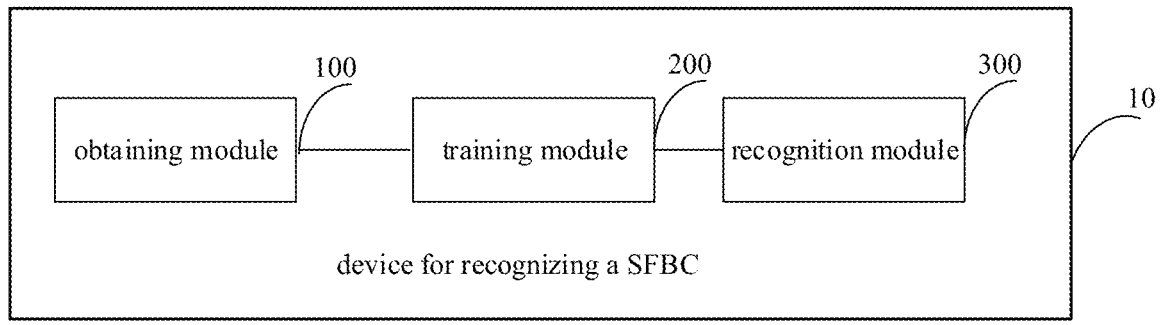
FIG. 8 is a block diagram illustrating a device for recognizing a SFBC according to an embodiment of the present disclosure.

FIG. 8 is a block diagram illustrating a device for recognizing a SFBC according to an embodiment of the present disclosure.

As illustrated in FIG. 8, the device 10 for recognizing a SFBC includes an obtaining module 100, a training module 200 and a recognition module 300.

The obtaining module 100 is configured to obtain a cross-correlation function of a reception signal, and obtain a Fourier transformation of the cross-correlation function.

The training module 200 is configured to arrange a real part and an imaginary part of the Fourier transformation separately, and input data containing labels into an initial CNN-LSTM network for training until convergence is reached, to obtain a final CNN-LSTM network.

The recognition module 300 is configured to obtain data to be recognized, and input the data to be recognized into the final CNN-LSTM network to obtain a SFBC recognition result.

In an embodiment, the cross-correlation function is determined as:

$$y = [y(0), y(1), \ldots y(K-1)],$$

where, $$y(k) = r_0(k)r_1(k + N/2), k = 0, 1, \ldots M,$$
$$K = M - \frac{N}{2},$$

where, $r_0(k)$ is a reception signal of a first antenna, $r_1(k+N/2)$ is a reception signal of a second antenna, M is a length of a reception signal sequence, N is a given subcarrier number, and K is a length of the cross-correlation function.

In some embodiments, the final CNN-LSTM network includes a convolutional layer, a pooling layer, three circulation layers, and two fully connected layers. The convolutional layer uses 256 convolution kernels to perform convolution on a signal to obtain 256 feature graphs of 1×128 dimension. Each convolution kernel is a 2*1 convolution kernel. The pooling layer performs dimension reduction on the output of the convolution layer to reduce the size of the feature graphs, and further to reduce the combined one-dimensional signal (1×128 dimension) to a signal of 1×64 dimension. The circulation layers include three LSTM networks configured to process the convoluted one-dimensional signal to acquire timing information of the reception signal. An output of the network is in a one-hot coding form of 1×2 dimension. An SM code corresponds to [1 0], and an AL code corresponds to [0 1]. An output layer uses a normalized exponential function, such as Soft-max, as an activation function, and other layers in the network use a rectified linear unit (ReLU) as the activation function.

In an embodiment, a spectrum of a SM signal has no peak value, and a spectrum of an AL signal has a peak value every K/16.

It should be noted that, the foregoing explanation of embodiments of the method for recognizing a space frequency block code (SFBC) is also applicable to the device for recognizing a space frequency block code (SFBC) according to these embodiments, which will not be repeated herein.

With the device for recognizing a SFBC according to embodiments of the present disclosure, by preprocessing the received SFBC signal, and then rearranging the real part and imaginary part of the obtained signal data and inputting the real part and imaginary part of the obtained signal data into the network, the spatial features of the signal is extracted by using the CNN, and the temporal features of the signal is extracted by using the LSTM, and finally outputted from the network through the full connection layer, and the SFBC recognition result is finally obtained. Thus, the serial sequence SFBC code under a single receiving antenna can be identified, and the trained network model can be directly used for recognition without the need to recalculate the statistical features of the signal. It has better performance in the case of low signal-to-noise ratio, avoiding the problem of repeated feature calculation and artificial design of parameters, thus improving adaptability.

Figure 9:
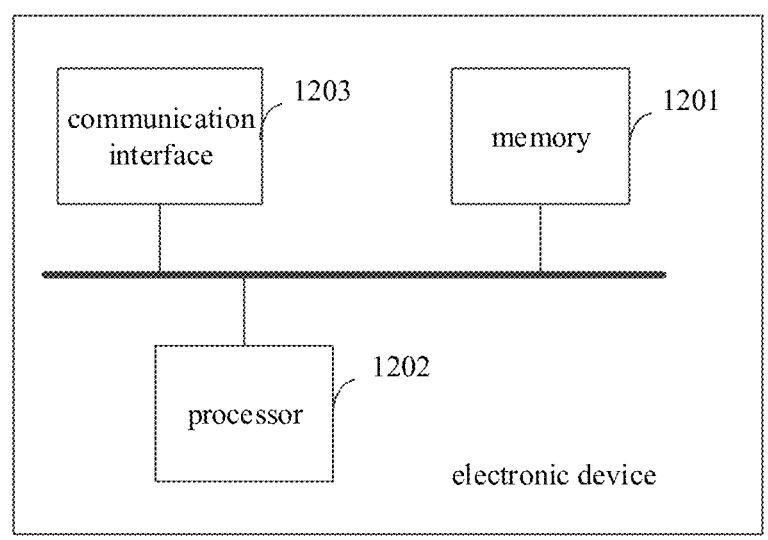
FIG. 9 is a block diagram illustrating an electronic device according to an embodiment of the present disclosure.

FIG. 9 is a block diagram illustrating an electronic device according to an embodiment of the present disclosure. The electronic device includes a memory 1201, a processor 1202, and a computer program stored in the memory 1201 and executable by the processor 1202.

When the processor 1202 executes the computer program, a method for recognizing a space frequency block code (SFBC) according to above embodiments is implemented.

In some embodiments, the electronic device may further include following.

A communication interface 1203 is configured for communication between the memory 1201 and the processor 1202.

The memory 1201 is configured to store the computer program executable on the processor 1202.

The memory 1201 may include a high speed random access memory (RAM), and may also include a non-volatile memory, such as at least one disk memory.

If the memory 1201, the processor 1202 and the communication interface 1203 are independently implemented, the communication interface 1203, the memory 1201 and the processor 1202 can be connected to each other through the bus and complete the communication between each other. If the memory 1201, the processor 1202 and the communication interface 1203 are independently implemented, the communication interface 1203, the memory 1201 and the processor 1202 can be connected to each other through the bus and complete the communication between each other. The bus 18 may be an Industry Standard Architecture (hereinafter referred to as ISA) bus, a Peripheral Component Interconnection (hereinafter referred to as PCI) bus, an extended industry standard architecture (hereinafter referred to as EISA). The bus may include an address bus, a data bus, a control bust, and the like. For ease of representation, In FIG. 9, the bus is represented by a single thick line, but it does not indicate that there is only one bus or one type of bus.

In some embodiments, if the memory 1201, the processor 1202 and the communication interface 1203 are integrated on one chip, the memory 1201, the processor 1202 and the communication interface 1203 can communicate with each other through the internal interface.

The processor 1202 may be a central processing unit (CPU) or an application specific integrated circuit (ASIC), or may be configured as one or more integrated circuits configured to implement the embodiments of the present disclosure.

Embodiments of the present disclosure further provide a computer readable storage medium with computer programs stored thereon. When the computer programs are executed by a processor, the above-mentioned method for recognizing a space frequency block code (SFBC) is implemented Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for recognizing a space frequency block code (SFBC), comprising:
    obtaining a cross-correlation function of a reception signal, and obtaining a Fourier transformation of the cross-correlation function;
    obtaining data containing labels by labeling a sample containing a real part and an imaginary part of the Fourier transformation, and inputting the data containing labels into an initial CNN-LSTM network for training until convergence is reached, to obtain a final CNN-LSTM network; and
    obtaining data to be recognized, and inputting the data to be recognized into the final CNN-LSTM network to obtain a SFBC recognition result.

2. The method according to claim 1, wherein, the cross-correlation function is determined as:

$$y=[y(0), y(1), \ldots y(K-1)]$$

where, $$y(k) = r_0(k)r_1(k+N/2), k = 0, 1, \ldots M,$$
$$K = M - \frac{N}{2},$$

where, $r_0(k)$ is a reception signal of a first antenna, $r_1(k+N/2)$ is a reception signal of a second antenna, M is a length of a reception signal sequence, N is a given subcarrier number, and K is a length of the cross-correlation function.

3. The method according to claim 1, wherein, the final CNN-LSTM network comprises a convolutional layer, a pooling layer, three circulation layers, and two fully connected layers;
    the convolutional layer is configured to perform convolution on a signal by using 256 convolution kernels to obtain 256 feature graphs of 1×128 dimension;
    the pooling layer is configured to perform dimension reduction on output of the convolution layer to reduce a size of the feature graphs, and reduce a combined one-dimensional signal (1×128 dimension) to a signal of 1×64 dimension;
    the circulation layers include three LSTM networks configured to process the convoluted one-dimensional signal to acquire timing information of the reception signal;
    an output of the network is in a one-hot coding form of 1×2 dimension;
    an SM code corresponds to [1 0], and an AL code corresponds to [0 1]; and
    an output layer uses a normalized exponential function, such as Soft-max, as an activation function, and other layers in the network use a rectified linear unit (ReLU) as the activation function.

4. The method according to claim 3, wherein, a spectrum of a SM (Spatial Multiplexing) signal has no peak value, and a spectrum of an AL (Alamouti) signal has a peak value every K/16.

5. An electronic device, comprising:
    a memory;
    a processor; and
    a computer program stored in the memory and executable by the processor, wherein, when the processor executes the computer program, a method for recognizing a space frequency block code (SFBC) is implemented, the method comprising:
obtaining a cross-correlation function of a reception signal, and obtaining a Fourier transformation of the cross-correlation function;
obtaining data containing labels by labeling a sample containing a real part and an imaginary part of the Fourier transformation, and inputting the data containing labels into an initial CNN-LSTM network for training until convergence is reached, to obtain a final CNN-LSTM network; and
obtaining data to be recognized, and inputting the data to be recognized into the final CNN-LSTM network to obtain a SFBC recognition result.

6. The electronic device according to claim 5, wherein, the cross-correlation function is determined as:

$$y=[y(0),y(1),\ldots y(K-1)]$$

where, $$y(k) = r_0(k)r_1(k+N/2), k = 0, 1, \ldots M,$$

$$K = M - \frac{N}{2},$$

where, $r_0(k)$ is a reception signal of a first antenna, $r_1(k+N/2)$ is a reception signal of a second antenna, M is a length of a reception signal sequence, N is a given subcarrier number, and K is a length of the cross-correlation function.

7. The electronic device according to claim 5, wherein, the final CNN-LSTM network comprises a convolutional layer, a pooling layer, three circulation layers, and two fully connected layers;
the convolutional layer is configured to perform convolution on a signal by using 256 convolution kernels to obtain 256 feature graphs of 1×128 dimension;
the pooling layer is configured to perform dimension reduction on output of the convolution layer to reduce a size of the feature graphs, and reduce a combined one-dimensional signal (1×128 dimension) to a signal of 1×64 dimension;
the circulation layers include three LSTM networks configured to process the convoluted one-dimensional signal to acquire timing information of the reception signal;
an output of the network is in a one-hot coding form of 1×2 dimension;
an SM code corresponds to [1 0], and an AL code corresponds to [0 1]; and
an output layer uses a normalized exponential function, such as Soft-max, as an activation function, and other layers in the network use a rectified linear unit (ReLU) as the activation function.

8. The electronic device according to claim 7, wherein, a spectrum of a SM (Spatial Multiplexing) signal has no peak value, and a spectrum of an AL (Alamouti) signal has a peak value every K/16.

9. A non-transitory computer-readable storage medium with computer programs stored thereon that, when executed by a processor, a method for recognizing a space frequency block code (SFBC) is implemented, the method comprising:
obtaining a cross-correlation function of a reception signal, and obtaining a Fourier transformation of the cross-correlation function;
obtaining data containing labels by labeling a sample containing a real part and an imaginary part of the Fourier transformation, and inputting the data containing labels into an initial CNN-LSTM network for training until convergence is reached, to obtain a final CNN-LSTM network; and
obtaining data to be recognized, and inputting the data to be recognized into the final CNN-LSTM network to obtain a SFBC recognition result.

10. The non-transitory computer-readable storage medium according to claim 9, wherein, the cross-correlation function is determined as:

$$y=[y(0),y(1),\ldots y(K-1)]$$

where, $$y(k) = r_0(k)r_1(k+N/2), k = 0, 1, \ldots M,$$

$$K = M - \frac{N}{2},$$

where, $r_0(k)$ is a reception signal of a first antenna, $r_1(k+N/2)$ is a reception signal of a second antenna, M is a length of a reception signal sequence, N is a given subcarrier number, and K is a length of the cross-correlation function.

11. The non-transitory computer-readable storage medium according to claim 9, wherein, the final CNN-LSTM network comprises a convolutional layer, a pooling layer, three circulation layers, and two fully connected layers;
the convolutional layer is configured to perform convolution on a signal by using 256 convolution kernels to obtain 256 feature graphs of 1×128 dimension;
the pooling layer is configured to perform dimension reduction on output of the convolution layer to reduce a size of the feature graphs, and reduce a combined one-dimensional signal (1×128 dimension) to a signal of 1×64 dimension;
the circulation layers include three LSTM networks configured to process the convoluted one-dimensional signal to acquire timing information of the reception signal;
an output of the network is in a one-hot coding form of 1×2 dimension;
an SM code corresponds to [1 0], and an AL code corresponds to [0 1]; and
an output layer uses a normalized exponential function, such as Soft-max, as an activation function, and other layers in the network use a rectified linear unit (ReLU) as the activation function.

12. The non-transitory computer-readable storage medium according to claim 11, wherein, a spectrum of a SM (Spatial Multiplexing) signal has no peak value, and a spectrum of an AL (Alamouti) signal has a peak value every K/16.

* * * * *